United States Patent
Blackwell

[19]

[11] Patent Number: 6,112,449
[45] Date of Patent: *Sep. 5, 2000

[54] FISHING ROD HOLDER AND METHOD

[76] Inventor: Terry L. Blackwell, 1105 Pine Log Ford Rd., Travelers Rest, S.C. 29690

[*] Notice: This patent issued on a continued prosecution application filed under 37 CFR 1.53(d), and is subject to the twenty year patent term provisions of 35 U.S.C. 154(a)(2).

[21] Appl. No.: 08/767,974

[22] Filed: Dec. 17, 1996

[51] Int. Cl.⁷ .................................................. A01K 97/10
[52] U.S. Cl. .............................................. 43/21.2; 248/538
[58] Field of Search ................... 43/21.2; 248/284.1, 248/292.12, 538

[56] References Cited

U.S. PATENT DOCUMENTS

| | | | |
|---|---|---|---|
| 358,307 | 2/1887 | Vermilye | 248/538 |
| 1,266,367 | 5/1918 | Wilson | 248/284.1 X |
| 2,888,220 | 5/1959 | Rose | 248/538 |
| 3,669,390 | 6/1972 | Nielson | 248/538 X |
| 3,835,568 | 9/1974 | Whitfield | 43/21.2 X |
| 3,956,846 | 5/1976 | Kent | 248/538 X |
| 5,000,608 | 3/1991 | Schmidt | 248/284.1 X |
| 5,088,224 | 2/1992 | Gutierrez | 248/538 X |

*Primary Examiner*—David A. Scherbel
*Assistant Examiner*—Anthony Ojini
*Attorney, Agent, or Firm*—Ralph Bailey

[57] ABSTRACT

A horizontal U-shaped elongated rod holder frame has aligned legs (A) which are open at the front and joined by a horizontal member serving as a rear support (D) for the fishing rod handle. The horizontal rod holder frame is also open at the top and has downwardly inclined legs converging in a V-shaped front support (C) a juncture with a vertical frame support (B) at an angle of approximately 45 degrees so as to provide a front support for the handle. A pair of opposed transversely aligned ears (E) are carried by the horizontal frame to restrain the handle against pivotal movement at a horizontal plane while a connector (F) is provided for securement of the rod holder frame to a mounting for adjustment in a vertical plane. Adjustment is also provided in the horizontal plane and for rotational positioning. A stop is carried adjacent the front support or by the handle to avoid dislodgement of the rod from the front.

5 Claims, 3 Drawing Sheets

FISHING ROD HOLDER AND METHOD

BACKGROUND OF THE INVENTION

This invention relates to an improved fishing rod holder and method for inserting and securing a rod and reel in an adjusted position using one hand and permitting easy removal in a continuous upward motion when a fish strikes.

Efforts have been made to provide effective fishing rod holders such as illustrated in U.S. Pat. No. 4,674,222. Such fishing rod holders have required manipulation of a movable ring or bail for engagement with an end of the rod handle while a forward part of the handle rests upon a horizontal support carried between frame members supported on a vertical surface by a bracket having spaced openings for receiving legs. Such constructions have proved to be expensive and so difficult to use and to adjust because of the necessity for positioning of the moveable ring as to discourage their practical use in fishing. Like other rod holders presently on the market, the patented rod holder is capable of only limited adjustment and is easily dislodged.

Other efforts to provide a simplified effective fishing rod holder and method are illustrated in U.S. Pat. Nos. 965,826; 1,192,112; 3,033,503; 3,327,978; 3,564,753; 3,835,568; and 4,261,128.

It would be desirable therefore to provide a fishing rod holder and method wherein most standard fishing rod handles and reels may be adjustably positioned while permitting easy removal by a continuous upward movement of a forward end of the handle.

SUMMARY OF THE INVENTION

Accordingly, it is an important object of the invention to provide a fishing rod holder and method wherein a generally horizontal frame provides front and rear supports for a fishing rod handle permitting easy removal of the rod as when a fish bites or when supplying a new bait or changing lures.

Another important object of the invention is to provide a fishing rod holder and method capable of almost universal adjustment of a rod and reel and securely restraining the rod and reel against dislodgement as when trolling or otherwise encountering an axial force tending to dislodge the rod and reel by pulling the handle forwardly out of the holder.

Another important object of the invention is to provide an adjustable fishing rod holder facilitating easy reception and removal of the rod and reel and which is capable of affording pivotal adjustment in vertical and horizontal planes as well as rotational adjustment so as to accommodate a sideways pull against the rod and reel as encountered during trolling.

The fishing rod holder and method contemplates utilizing a generally horizontal frame open at the top and forward end providing a front support for the rod holder open at the top and a rear support beneath which the rod handle is inserted. The horizontal frame is supported at a forward end by a generally vertical frame support rod which has a mounting connector such as a threaded lower end for positioning the same upon the ground, on a dock or on the side of a boat. Depending ears are carried by the horizontal frame for restraining the handle against pivotal movement in horizontal plane, the handle being supported at a forward end by a front support to avoid pivotal movement in a horizontal plane. The vertical frame support is preferably carried by a pivot link which is threadably secured at an upper end for adjustment of the rod in a vertical plane, a lower end of the pivot link being secured to an anchor link for rotational adjustment. The anchor link at its lower end provides threadable securement to a bracket permitting adjustment in a horizontal plane. It is also desirable that suitable means be provided for engaging the handle against a force pulling from the front of the rod tending to dislodge the handle forwardly from the fishing rod holder. Alternate securement means such as a bracket or a ground stake may provide suitable mounting for the horizontal frame and its vertical support member upon a dock or on the ground. Reels of any desired type including bait casting reels, as well as open or closed face spinning reels may be utilized.

Because of the great ranges of adjustment permitted by apparatus and method in accordance with the invention, the skill of the fisherman may be utilized to maximum advantage in positioning the rod for best getting a fish to strike and then removing the rod for setting the hook and playing the fish.

While the relative positioning of the parts has been described, for example, as generally vertical or horizontal, it is to be understood that these terms are not used in a geometric sense but only to describe their relative position when in typical positions during fishing and are utilized to describe the positioning of the parts in relation to one another.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

A fishing rod holder for effectively restraining and maintaining a rod and reel in a desired adjusted position while unattended yet permitting ready removal from the holder when a fish strikes has a generally U-shaped elongated horizontal rod holder frame open at the top and includes aligned legs A open at one end. A generally vertical frame support B is carried below the rod holder frame. A generally V-shaped rod handle front support has converging legs C each connected on one end to a respective free end of each aligned leg and at a juncture of said converging legs to an upper end of the vertical frame support. A rear support D for a fishing rod handle limits upward movement of a back end of the handle. A pair of opposed transversely aligned ears E depend from the legs adjacent the connecting member forming the rear support D. A mounting connector F is carried on the other end of the vertical frame support. Thus, the handle is supported by front and rear supports of a frame adjustable for movement in a vertical plane and by depending ears and the front support against horizontal pivotal movement, and is easily tilted upwardly from a front of the handle for removal from the rod holder frame when a fish strikes.

Figure 1:
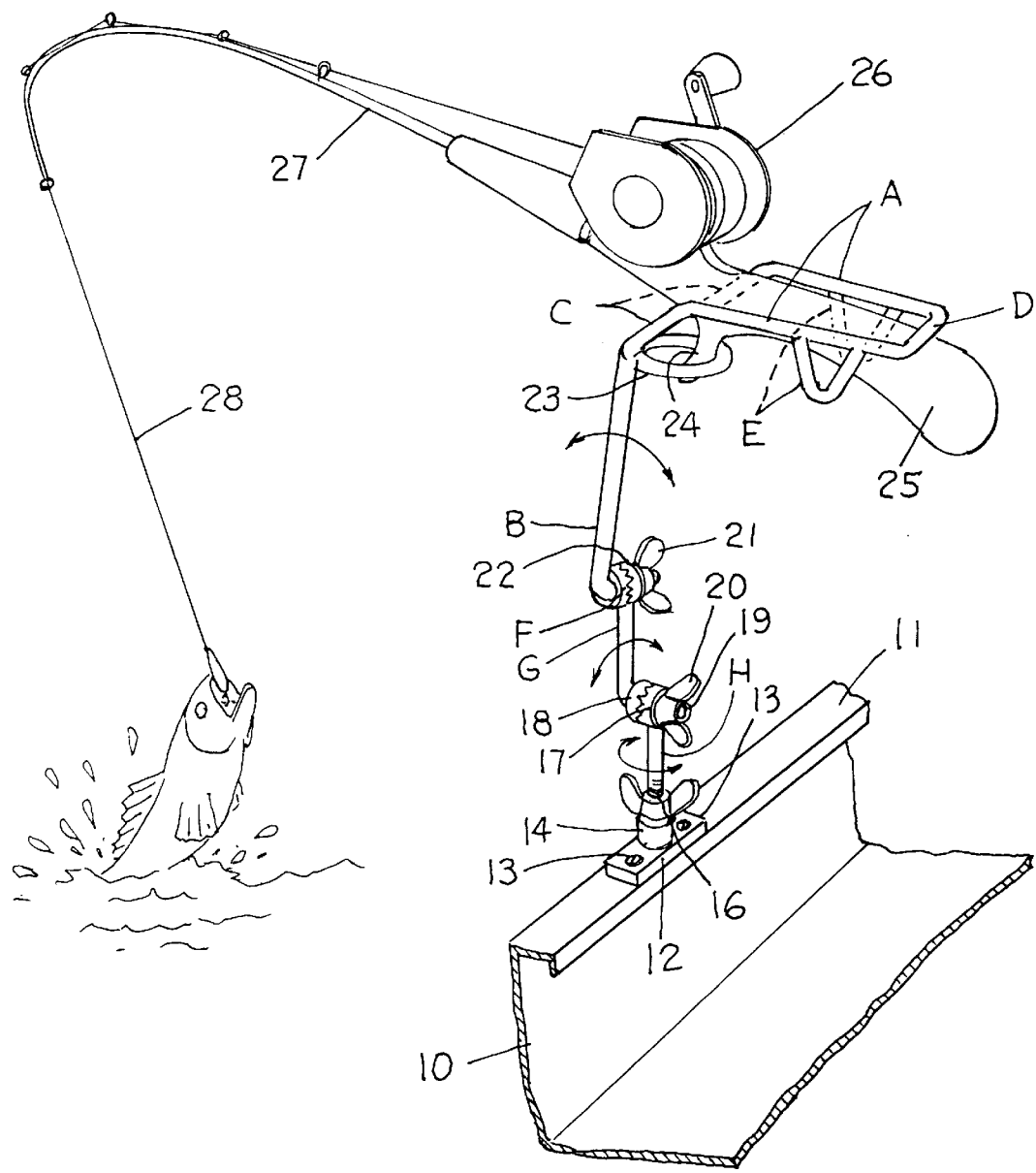
FIG. 1 is a perspective view illustrating a fishing rod holder and adjustable support therefor constructed in accordance with the invention carried, for example, on an upper flat surface of the sides of a John boat.

Referring more particularly to FIG. 1, a side of a John boat is designated at 10. The side 10 has a horizontal flat upper surface 11 which carries a bracket having a base 12 secured by screws 13 to the flat surface 11. The base 12 carries an upstanding internally threaded receiving or mounting member 14. A wing nut 15 is carried upon a threaded lower end of an anchor link H which has a threaded lower end as illustrated as 16 for carrying the wing nut 15 for fixing the anchor link H in a desired position, thus providing 360 degrees rotation in the direction of the arrow for adjusting the rod and reel in a horizontal plane.

The anchor link H has an upper member 17 having an outer serrated surface for mating with an opposed fastening member 18 having a threaded shank 19 for carrying a wing nut 20 for securement of a pivot link G for rotational adjustment. The vertical frame support B has a mounting connector F carrying a wing nut 21 on a threaded projection for securing a connector 22 at an upper end of the pivot link G in opposed relation. The wing nut provides securement in an adjusted pivotal position in a vertical plane so that the vertical frame support B may be tilted forwardly or rearwardly to position the generally horizontal frame in a tilted position depending on whether or not the rod should be pointed downwardly toward the water or raised so that the tip of the rod is inclined upwardly as in trolling.

Referring more particularly to FIG. 1, it will be noted that a horizontally disposed trigger ring 23 is secured at the juncture of the V-shaped rod handle front support C so as to receive the support or trigger 24 for the index finger. The handle 25 is illustrated as having a pistol grip and as carrying a bait casting reel 26. The handle 25 is confined between the opposed transversely spaced ears F which together with the V-shaped front support C restrain the rod handle against pivotal movement in a horizontal plane. The trigger ring 23 prevents dislodgement of the rod holder as when encountering a forward pull from the end of the rod tending to pull the handle forwardly from the holder. It will be observed in FIG. 1 that the rod 27 is inclined slightly upwardly so as to best resist a pull on the line 28 as when a fish is on the line. Since fish pull downwardly, opportunity for dislodgement of the handle from the holder during fishing is limited except when a forward pull is encountered as during trolling.

Figure 3:
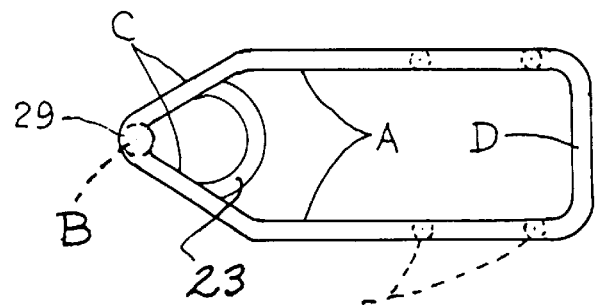
FIG. 3 is a top plan view illustrating the generally horizontal holder frame which is open at the top and at a forward end with a V-shaped open toped front support and a horizontal back support.
Figure 2:
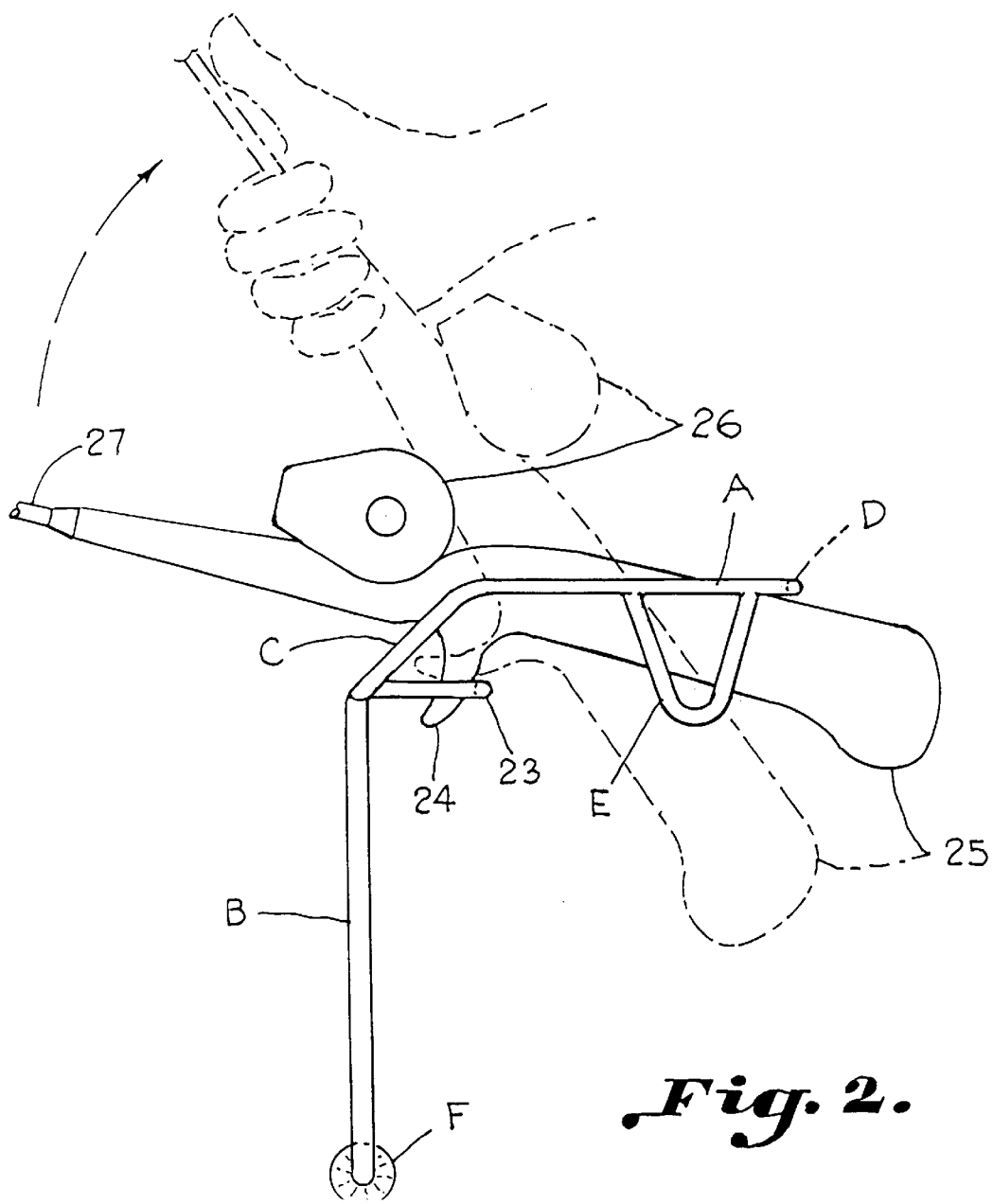
FIG. 2 is a side elevation illustrating the generally horizontal frame of the fishing rod holder and its generally vertical support in fishing position carrying an open face reel.

Referring more particularly to FIG. 2, the manner in which the rod is removed from the holder in continuous single motion is illustrated. The hand of the fisherman engages the handle just above the reel and pivots the rod upwardly in the direction of the arrow freeing the handle in a continuous motion removing the handle from the horizontal frame. This action is permitted because the horizontal frame is open at the top and the front while a back of the handle is carried beneath the rear support D. The generally V-shaped rod holder front support is best illustrated in FIG. 3 as having converging legs C which are integral on one end with the open ends of the aligned legs A providing an opening at the front while providing a front support by downwardly inclined converging surfaces of the legs C which are joined at a juncture 29 for securement to the vertical frame support B.

Figure 4:
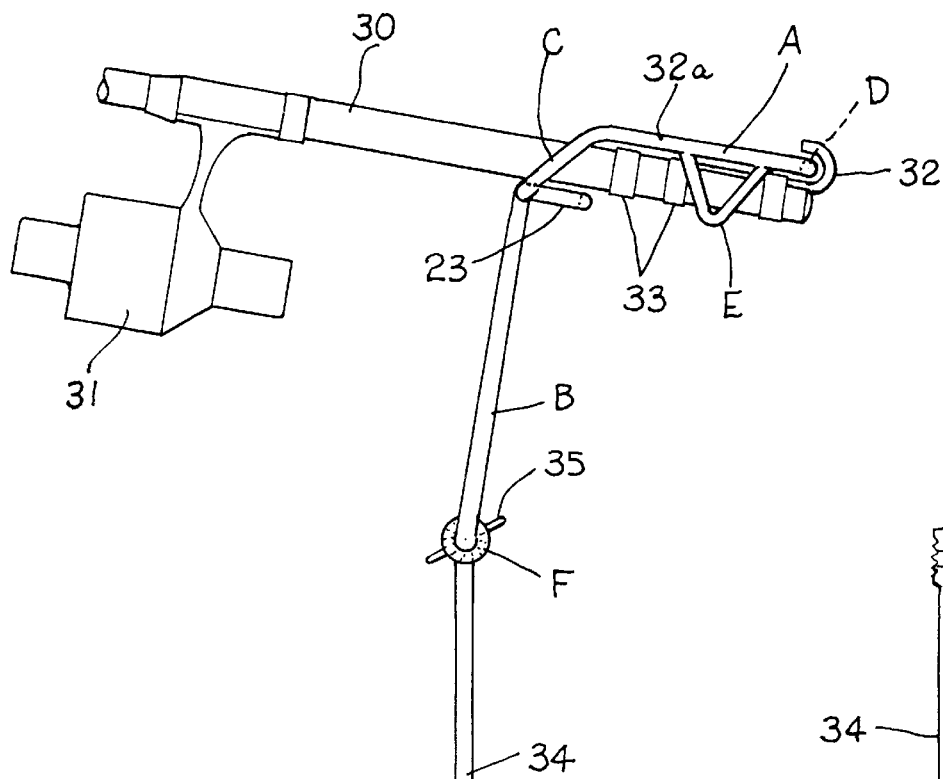
FIG. 4 is a side elevation illustrating a modified form of the invention wherein a mounting support is illustrated in the form of a ground stake having spaced prongs maintaining the frame of the fishing rod holder in proper orientation for horizontal and vertical adjustment.
Figure 5:
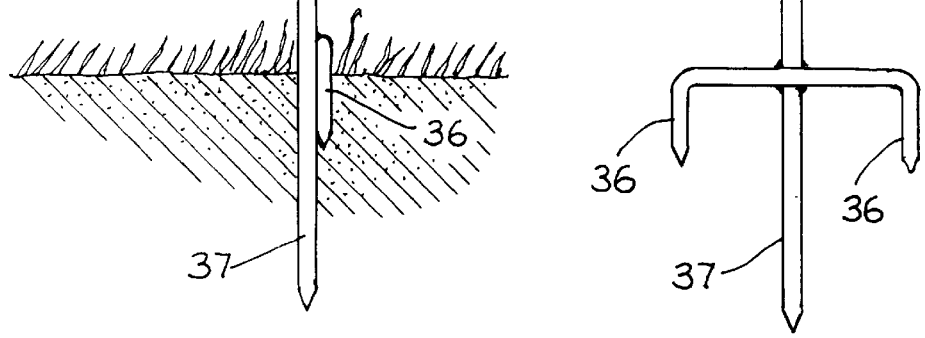
FIG. 5 is a front view of the mounting support illustrating the depending prongs of the ground stake fixing the rod holder in an adjusted position against rotation in a horizontal plane.

Referring more particularly to FIG. 4, a modified form of the invention is illustrated as positioning a rod having a straight handle 30 carrying an open face reel 31. The straight handle 30 is illustrated as having been provided with a receiving member 32 open at the front for engagement with the rear support D. The receiving member is illustrated as being carried by a shank 32a which is secured as by taping at spaced locations 33 for securement to the handle. The receiving member 32 is provided since the horizontal trigger ring 23 is ineffective in preventing forward movement of the handle 30 in the event a force is encountered as during trolling tending to dislodge the handle from the holder. A ground stake is illustrated at 34 which is suitably secured as by the wing nut 35 at an upper end to the connector F at the lower end of the vertical frame support B. A pair of spaced prongs 36 are carried adjacent a ground penetrating lower projection 37 of the stake 34.

It will be observed that the various components of a fishing rod holder are illustrated as being constructed as from round rod stock. Any suitable construction may be utilized as a substitute for the rod stock. The frame components are integrally joined and may be molded of suitable structural members. Mounting brackets, ground stakes and the like may be appropriately provided for adjustment whether to the ground, dock or boat.

While a preferred embodiment of the invention has been described using specific terms, such description is for illustrative purposes only, and it is to be understood that changes and variations may be made without departing from the spirit or scope of the following claims.

What is claimed is:

1. A fishing rod holder for effectively restraining and maintaining a rod and reel in a desired adjusted position while unattended yet permitting ready removal from the holder when a fish strikes comprising:

a longitudinal generally U-shaped elongated horizontal rod holder frame constructed of structural material open at the top and including aligned longitudinal legs open at one end;

a generally V-shaped front support for the rod holder frame having converging legs each fixedly connected to an aligned leg said converging legs extending downwardly from each respective aligned leg having a juncture at a lower end of said converging legs below said U-shaped rod holder frame for confining said rod handle therebetween;

a generally vertical support carried below said rod holder frame fixedly connected on one end to said juncture so that said U-shaped rod holder frame extends substantially entirely rearwardly of the vertical frame;

a rear support including a transverse member being of rigid structural material fixedly connected at each end to the aligned longitudinal leg for confining a fishing rod handle therebeneath limiting upward movement of a back end of the handle;

a pair of opposed transversely aligned ears depending from said legs and being fixedly carried thereby; and a mounting connector on a remote end of said vertical support;

whereby the fishing rod handle is carried by front and rear supports and restrained by said ears and said front support against horizontal pivotal movement, while being tiltable upwardly for removal from the rod holder frame when a fish strikes.

2. The structure set forth in claim 1 including a horizontal trigger ring extending rearwardly from said juncture below said U-shaped rod holder frame for receiving a finger support on said rod handle.

3. The structure set forth in claim 2 including a bracket for removable positioning on said handle and having an open forward end receiving said rear support for securement against dislodgement of the rod from the front.

4. The structure set forth in claim 1 including an anchor link, an intermediate pivot link connected between said vertical frame support and said anchor link a first threaded connection on one end of said pivot link permitting pivotal movement in vertical forward plane, and a second threaded connection on the other end of said link permitting pivotal movement in a vertical lateral plane.

5. The structure set forth in claim 1 including a ground stake having fixed spaced vertical ground engaging stabilizing members thereon for supporting said vertical frame support in fishing position.

* * * * *